United States Patent Office 3,414,400
Patented Dec. 3, 1968

3,414,400
HERBICIDAL COMPOSITIONS
Shiro Watanabe, Osaka-shi, Japan, assignor to Daikin Kogo Kabushiki Kaisha, Osaka-shi, Japan
No Drawing. Filed June 14, 1966, Ser. No. 557,385
Claims priority, application Japan, June 16, 1965, 40/36,135
9 Claims. (Cl. 71—118)

ABSTRACT OF THE DISCLOSURE

A herbical composition, and process for the use thereof, the protection of monocotyledonous plants comprising, as the effective components thereof, 2′-methyl-4′-chlorophenoxyaceto-3-trifluoromethylanilide and 4-di-n-propylamino-3,5-dinitro-1-trifluoromethylbenzene in a 4:1 to 1:2 weight ratio.

---

This invention relates to herbicidal compositions for the protection of monocotyledonous plants. More particularly, the invention pertains to a novel and useful composition to be used for the elimination of herbs from the fields of rice, wheat, barley, Indian corn, onion and the like monocotyledonous plants.

One object of this invention is the provision of a composition having a herbicidal ability to destroy various herbs, including broad-leaved herbs, such as lamb's-quartres, chickweed, smartweed, and the like, and narrow-leaved herbs, such as barnyard grass, pickerelweed, crabgrass, and so on, without imparting any chemical injuries to the monocotyledonous plants to be protected.

Another object of the invention is the provision of a herbicidal composition, the effective ingredients of which display markedly the aforesaid effects in a relatively small dosage, so that the composition is pronounced in economic utility.

The above and other objects of this invention are accomplished by a herbicidal composition, comprising in a specific composition ratio 2′-methyl-4′-chlorophenoxy-aceto-3-trifluoromethylanilide (to be called hereinafter "Compound A") and 4-di-n-propylamino-3,5-dinitro-1-trifluoromethylbenzene (to be called hereinatfer "Compound B").

Compound A employed in this invention is of the formula:

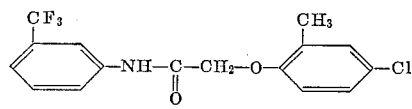

It is a whitish crystalline substance having a melting point of 146°–146.5° C. and easily soluble in one or more species of alcohol, acetone, tetrahydrofuran, methylpyrrolidone, dimethylformamide and γ-butylolactone at an elevated or normal temperature.

The synthesis of said compound A and the discovery of its herbicidal ability have been made for the first time in the art by the present inventors, obtaining Japanese Patent 470,779, French Patent 1,416,095 and British Patent 1,009,200, and the application for letters patent has been filed in the United States under Serial No. 333,198 filed; 1963 now abandoned.

Compound B is of the formula:

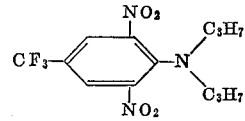

having a herbicidal ability known in the art under Japanese Patent 411,647 and British Patent 917,253.

Of said Compounds A and B, Compound A must be employed in a relatively large dosage in order to obtain a satisfactory herbicidal effect, although its chemical injuries on the monocotyledonous plants to be protected are relatively small, whereas Compound B must also be employed in a large dosage for the destruction of broad-leaved herbs in spite of the resultant chemical injuries markedly pronounced, so that these compounds are both disadvantageous from the economic points of view.

Our prolonged researchers, however, have now disclosed that said Compounds A and B, when applied in combination in a specific ratio, display a synergistic effect which cannot be secured in single application. Such effect can further be obtained in a small dosage, destroying with no chemical injuries all the principal herbs hampering the growth of monocotyledonous plants. The composition containing said Compounds A and B has thus been discovered to be a new and useful herbicidal composition which can be employed quite economically and safely. The synergistic effect of said composition, further, is displayed markedly when Compounds A and B are amixed in a weight ratio of 4:1 to 1:2, preferably 4:1 to 1:1. But the effect in question becomes unpronounced outside of said range of composition ratio.

In order to clarify the synergistic effect of the composition of this invention, the following tests were performed in which Compounds A and B were applied singly and in combination in a specific composition ratio as specified in Tables 1 and 2 below. In each test was employed a wettable powder prepared as in Examples 2, containing 25 percent by weight of Compounds A and B as main effective ingredients.

Test I.—Herbicidal effects for transplanted rice plants

In 0.0002—are Wagner pots was placed sandy soil, and the bed was seeded 3 cm. deep with herbs as specified in Table 1 below. The bed thus prepared was impregnated with water, and rice seedlings (15 cm. tall and at the 3–4-leaf stage) raised in a nursery were transplanted in said soil 3 pieces per pot. 4 days after seeding of herbs and transplanting of rice seedings, the composition to be tested, diluted with water to 250 times, was applied to said soil in a dosage as specified in Table 1. The planted pots thus treated were then stored in a glass room at 25° ± 2° C. The water in the pots drained off, reducing the level by 4–5 cm. per day, so that fresh water was supplied to maintain constantly the level of water in the pots at a height of 5 cm. from the surface of the soil. 40 days after treatment, the grown herbs were examined for total number and weight as shown in Table 1 below. In the treated versus non-treated column is shown the ratio of the total number and gross weight of the herbs grown in the treated pot to those of the non-treated pot as 100 percent. Plant injuries were determined in accordance with the following standards:

—: No injuries observed;
±: Blade tips turned yellow;
+: Old leaves withered;
++: Almost all leaves blighted.

TABLE 1

| Pot No. | A:B in wt. percent | Dose in g./are | Herbs | | | | | | | | | | | | Treated vs. Non-tr. | | Plant Injr. |
|---|---|---|---|---|---|---|---|---|---|---|---|---|---|---|---|---|---|
| | | | A | | B | | C | | D | | E | | Total | | | | |
| | | | Num. | Wt. | Num. | Wt. | Num. | Wt. | Num. | Wt. | Num. | Wt. | Num. | Wt. | Num. | Wt. | |
| 0 | 0:0 | 0 | 29 | 10.8 | 20 | 1.9 | 35 | 4.4 | 21 | 1.8 | 10 | 0.5 | 115 | 18.3 | 100 | 100 | |
| 1 | 1:0 | 10 | 14 | 5.5 | 11 | 1.0 | 2 | 0.1 | 3 | 0.1 | 6 | 0.3 | 36 | 7 | 31 | 38 | ± |
| 2 | 1:0 | 20 | 3 | 1.0 | 2 | 0.1 | 0 | 0 | 0 | 0 | 2 | 0.1 | 7 | 1.2 | 6 | 7 | + |
| 3 | 0:1 | 10 | 8 | 2.5 | 15 | 1.5 | 7 | 1.0 | 7 | 0.5 | 8 | 0.4 | 45 | 5.9 | 39 | 32 | + |
| 4 | 0:1 | 20 | 0 | 0 | 10 | 0.9 | 0 | 0 | 0 | 0 | 5 | 0.2 | 15 | 1.1 | 13 | 6 | ++ |
| 5 | 1:3 | 10 | 4 | 1.6 | 10 | 1.0 | 3 | 0.5 | 2 | 0.1 | 9 | 0.5 | 28 | 3.7 | 25 | 20 | ± |
| 6 | 1:3 | 20 | 0 | 0 | 2 | 0.1 | 0 | 0 | 0 | 0 | 2 | 0.1 | 4 | 0.2 | 3 | 1 | + |
| 7 | 1:2 | 10 | 0 | 0 | 3 | 0.1 | 0 | 0 | 0 | 0 | 2 | 0.1 | 5 | 0.2 | 4 | 1 | |
| 8 | 1:2 | 20 | 0 | 0 | 1 | 0.1 | 0 | 0 | 0 | 0 | 0 | 0 | 1 | 0.1 | 1 | 1 | ± |
| 9 | 1:1 | 10 | 3 | 1.0 | 7 | 0.5 | 0 | 0 | 0 | 0 | 4 | 0.2 | 14 | 1.7 | 12 | 9 | |
| 10 | 1:1 | 20 | 0 | 0 | 0 | 0 | 0 | 0 | 0 | 0 | 0 | 0 | 0 | 0 | 0 | 0 | |
| 11 | 2:1 | 10 | 0 | 0 | 1 | 0.1 | 0 | 0 | 0 | 0 | 1 | 0.1 | 2 | 0.2 | 2 | 1 | |
| 12 | 2:1 | 20 | 0 | 0 | 0 | 0 | 0 | 0 | 0 | 0 | 0 | 0 | 0 | 0 | 0 | 0 | |
| 13 | 4:1 | 10 | 4 | 1.7 | 10 | 0.9 | 2 | 0.1 | 2 | 0.1 | 4 | 0.2 | 22 | 3.0 | 18 | 16 | |
| 14 | 4:1 | 20 | 0 | 0 | 0 | 0 | 0 | 0 | 0 | 0 | 2 | 0.1 | 2 | 0.1 | 2 | 1 | |
| 15 | 5:1 | 10 | 13 | 5.0 | 11 | 1.0 | 2 | 0.1 | 3 | 0.1 | 6 | 0.3 | 35 | 6.5 | 30 | 35 | ± |
| 16 | 5:1 | 20 | 3 | 1.0 | 2 | 0.1 | 0 | 0 | 0 | 0 | 2 | 0.1 | 7 | 1.2 | 6 | 7 | + |

NOTE.—All weights, unless otherwise stated, are in grams. (Herb A=Barnyard grass (*Panicum crusgalli* var. *submutica*); Herb B=Pickerelweed (*Monochoria vaginalis*); Herb C=Sedge (*Cyperus microiria*); Herb D=Toothcup (*Rotala indica* var. *uliginosa*); Herb E=Slender spikerush(*Eleocharis acicularis*).

Test II.—Herbicidal effects for onions and barley

In 0.001—are Wagner pots was placed sandy soil, and the bed was seeded 3–5 cm. deep per pot 5 pieces of onion seed and 10 pieces of barley, together with herbs as specified in Table 2 below. The composition to be tested, diluted with water to 1,000 times, was applied to the soil in dosages as specified in said table. The pots thus treated were stored in a glass room at 10°–20° C. Determination of the total number and weight of the herbs grown and chemical injuries on the plants to be protected were carried out 2 months after seeding according to the procedures as specified in Test I. Treated versus non-treated herb ratio was also determined as in Test 1.

cured with no substantial chemical injuries when the dose was raised to 20 grams per are.

(3) Such synergistic effect, however, could not be maintained, when Compounds A and B were employed in a ratio beyond the range of 4:1 to 1:2 by weight. A composition, for instance, containing Compounds A and B in a weight ratio of 1:3, could not display satisfactory herbicidal effects in 10 grams per are, and failed to eliminate herbs even in 20 grams per are. Accompanying plant injuries were also pronounced. (See Pots 5, 6, 25 and 26.) Almost the same tendency was observed with Pots 15, 16, 35 and 36, where Compounds A and B were employed in a weight ratio of 1:5.

Thus, it has been established that Compounds A and

TABLE 2

| Pot No. | A:B in wt. percent | Dose in g./are | Herbs | | | | | | | | | | | | Treated vs. Non-tr. | | Plant injr. | |
|---|---|---|---|---|---|---|---|---|---|---|---|---|---|---|---|---|---|---|
| | | | F | | G | | H | | I | | J | | Total | | | | Barley | Onion |
| | | | Num. | Wt. | Num. | Wt. | Num. | Wt. | Num. | Wt. | Num. | Wt. | Num. | Wt. | Num. | Wt. | | |
| 20 | 0:0 | 0 | 44 | 38.2 | 31 | 24.5 | 25 | 37.5 | 102 | 61.0 | 99 | 49.0 | 301 | 210.2 | 100 | 100 | | |
| 21 | 1:0 | 10 | 22 | 2.2 | 15 | 3.0 | 7 | 2.0 | 54 | 22.4 | 55 | 14.5 | 153 | 44.1 | 51 | 21 | | |
| 22 | 1:0 | 20 | 9 | 1.0 | 11 | 1.0 | 0 | 0 | 32 | 7.8 | 20 | 7.0 | 72 | 16.8 | 24 | 8 | ± | |
| 23 | 0:1 | 10 | 36 | 18.0 | 28 | 19.0 | 14 | 3.0 | 51 | 12.0 | 75 | 11.0 | 204 | 63.0 | 68 | 30 | ± | |
| 24 | 0:1 | 20 | 28 | 11.0 | 25 | 14.2 | 5 | 1.0 | 0 | 0 | 0 | 0 | 58 | 25.2 | 19 | 12 | + | ± |
| 25 | 1:3 | 10 | 33 | 13.0 | 24 | 16.0 | 12 | 2.5 | 56 | 14.0 | 62 | 13.3 | 187 | 58.8 | 62 | 28 | ± | |
| 26 | 1:3 | 20 | 25 | 9.0 | 23 | 13.5 | 4 | 0.5 | 0 | 0 | 6 | 0.5 | 58 | 23.0 | 19 | 11 | + | ± |
| 27 | 1:2 | 10 | 18 | 8.5 | 14 | 7.0 | 11 | 2.5 | 3 | 0.4 | 5 | 0.5 | 51 | 18.9 | 17 | 9 | | |
| 28 | 1:2 | 20 | 7 | 5.0 | 8 | 4.5 | 5 | 1.0 | 0 | 0 | 0 | 0 | 20 | 10.5 | 7 | 5 | ± | |
| 29 | 1:1 | 10 | 10 | 6.0 | 7 | 4.0 | 5 | 1.0 | 8 | 1.0 | 6 | 0.5 | 69 | 25.2 | 23 | 12 | | |
| 30 | 1:1 | 20 | 6 | 2.5 | 5 | 3.0 | 4 | 0.8 | 0 | 0 | 0 | 0 | 15 | 6.3 | 5 | 3 | ± | |
| 31 | 2:1 | 10 | 0 | 0 | 0 | 0 | 0 | 0 | 12 | 4.0 | 8 | 2.3 | 20 | 6.3 | 7 | 3 | | |
| 32 | 2:1 | 20 | 0 | 0 | 0 | 0 | 0 | 0 | 0 | 0 | 0 | 0 | 0 | 0 | 0 | 0 | | |
| 33 | 4:1 | 10 | 7 | 3.2 | 3 | 1.8 | 10 | 2.0 | 13 | 6.9 | 12 | 5.0 | 45 | 18.9 | 15 | 9 | | |
| 34 | 4:1 | 20 | 0 | 0 | 0 | 0 | 0 | 0 | 10 | 1.2 | 11 | 3.0 | 21 | 4.2 | 7 | 2 | | |
| 35 | 5:1 | 10 | 15 | 5.0 | 18 | 8.0 | 10 | 2.0 | 41 | 15.0 | 39 | 12.0 | 123 | 42.0 | 41 | 20 | | |
| 36 | 5:1 | 20 | 3 | 0.6 | 2 | 0.6 | 0 | 0 | 24 | 5.5 | 25 | 8.0 | 54 | 14.7 | 18 | 7 | ± | ± |

NOTE.—All weights, unless othrwise stated, are in grams.  Herb F: Chickweed (*Stellaria media*); Herb G: *Stellaria alsine*; Herb H: Bindweed (*Capsella bursa-pastoris*); Herb I: Dent foxtail (*Alopecurus aequalis*); Herb J: Dwarf spear grass (*Poa annua*).

What may be apparent in view of the foregoings are:

(1) Compounds A and B, when employed singly in 10 grams each per are, could not display satisfactory herbicidal effects, allowing not a few herbs to grow (see Pots 1, 3, 21 and 23). When each dose was raised to 20 grams per are, the herbicidal effects could be augmented (see Pots 2, 4, 22 and 24). But the accompanying chemical injuries were also pronounced. Particularly, Pots 2 and 4 (rice) and 24 (barley) showed marked injuries, and Pot 22 could not be effectively protected from herbs even though the dose was raised to 20 grams per are.

(2) Compounds A and B, on the other hand, when employed in combination in a weight ratio of 4:1 to 1:2, displayed particularly pronounced herbicidal effects even in 10 grams per are (compare Pots 7 to 14 and 27 to 34 where said compounds were employed in combination in the aforesaid ratio with Pots 1, 3, 21 and 23 where said compounds were employed singly).

This synergistic effect was further augmented and se-

B employed in combination in a weight ratio of 4:1 to 1:2, display a marked synergistic effect even in 10 grams per are, which is equivalent to or more pronounced than the hericidal effect of said Compounds A and B employed singly in 20 grams per are. Augmented herbicidal effects by an increased dosage, further, accompany no substantial injuries on the plants to be protected.

The composition of this invention displays particularly marked effects on the herbs on and immediately after the sprouting stage. Accordingly, the composition is desirably applied during a 5-day period before or after the seeding of the plants to be protected or during a 2–10-day period after the transplanting of seedling, whereby the growth of the herbs is effectively inhibited during the entire course of growth of the plants. The dosage to be applied ranges from 10 to 20 grams per are on the basis of Compounds A and B as main ingredients, although smaller or larger amounts are applicable without accompanying almost any plant injuries. As shown in Example 2, for instance, satisfactory heribcidal effects can be secured in 7.5 grams per are, and almost no substantial injuries are observed even in 30 grams per are with substantial herbicidal effects.

The composition of this invention is obtained in the form of dust, grains, wettable powder and emulsifiable solution. These products are prepared from Compounds A and B together with a suitable carrier according to the conventional method. As a carrier, there is employed one or more species of (a) solid carriers, such as clay, talc, diatomaceous earth and bentonite; (b) ionic and non-ionic surface-active agents, such as condensation products of ethylene oxides or propylene oxides with organic acids or phenols, soaps, sodium sulfonate and sugar esters; and (c) organic solvents, such as xylene, benzene, methanol, ethanol, isopropanol, methylnaphthalene, kerosene, scetone, methylethylketone and dimethylformamide. Adhesive agents and pigments may also be used.

The suitable concentration of Compounds A and B as main effective ingredients ranges from 0.5 to 20 percent by weight in the case of dust and pellet preparation, and from 5 to 70 percent by weight in the case of wettable powder and emulsifiable solution. In application, dust and pellet forms are employed without diluting, whereas wettable powder and emulsifiable solution are diluted with water or other suitable diluent to 200–5,000 times the original weight.

Preferred examples are as follows wherein all parts are by weight:

EXAMPLE 1

| | Parts |
|---|---|
| Compound A | 3.0 |
| Compound B | 1.5 |
| Bentonite | 20.0 |
| Talc | 62.5 |
| Sodium lignin sulfonate | 1.0 |
| Sodium lauryl sulfonate | 2.0 |
| Urea | 10.0 |

The above components were admixed homogeneously, kneaded with water, dried at room temperature, and prepared into pellets of about 0.5 mm. in diameter on the average.

Immediately following seeding with barley a field containing the seeds of crabgrass (*Digitaria viridis*), chickweed (*Stellaria media*), *Stellaria alsine*, bindweed (*Capsella bursa-pastoris*), dent foxtail (*Alopecurus aequalis*) and dwarf spear grass (*Poa annua*), the pellets prepared as above were sprayed in 15 grams per are on the basis of Compounds A and B as main effective ingredients. Examination carried out 2 months after application showed that the growth of the herbs was completely inhibited with no plant injuries. When harvested, there was observed a substantial gain in the crops as compared with control.

EXAMPLE 2

| | Parts |
|---|---|
| Compound A | 20.0 |
| Compound B | 10.0 |
| Sodium lauryl sulfonate | 4.0 |
| Methyl cellulose | 2.0 |
| Clay | 64.0 |

The above components were homogeneously mixed and pulverized into wettable powder.

Immediately following seeding with Indian corn a field containing the seeds of sedge (*Cyperus microiria*), lamb's quarter (*Chenopodium album*), purselane (*Portulaca oleracea*), chickweed (*Stellaria media*), smartweed (*Polygonum blumei*) and crabgrass (*Digitaria viridis*), the wettable powder prepared as above and diluted with water to 1,000 times the original weight was sprayed in 20 grams per are on the basis of Compounds A and B as main effective ingredients. When examined 40 days after application, the growth of the herbs was completely prohibited with no plant injuries, yielding a substantial gain in the resultant crops.

In a paddy field, on the other hand, containing the seeds of barnyard grass (*Panicum crusgallia* var. *submutiea*), pickerelweed (*Monochorid vaginalis*), sedge (*Cyperus microiria*), toothcup (*Rotala indicia* var. *uliginosa*) and slender spikerush (*Eleocharis acicularis*) were transplanted rice seedlings (15 cm. high and at the 3–4-leaf stage). 4 days after transplanting, the wettable powder prepared as above and diluted with water to 1,000 times was sprayed in 7.5 grams per are on the basis of Compounds A and B. Examination carried out 40 days after application showed a complete elimination of the herbs with no plant injuries. When harvested, there was observed a substantial gain in the crops.

EXAMPLE 3

| | Parts |
|---|---|
| Compound A | 15.0 |
| Compound B | 5.0 |
| Isophorone | 40.0 |
| Xylene | 20.0 |
| 1:10 Molar condensation product of nonyl phenol and ethylene oxide | 20.0 |

The above components were homogeneously mixed with water and prepared into an emulsifiable solution.

EXAMPLE 4

| | Parts |
|---|---|
| Compound A | 1.5 |
| Compound B | 1.5 |
| Clay | 97.0 |

The above components were homogeneously mixed and pulverized into dust.

I claim:
1. A herbicidal composition comprising, as the herbicidal constituents thereof, and in combination with an inert carrier, herbicidal effective quantities of
   (a) 2' - methyl-4'-chlorophenoxyaceto - 3 - trifluoromethylanilide and
   (b) 4-di-n-propylamino - 3,5 - dinitro-1-trifluoromethylbenzene, said (a) and (b) being present, respectively, in said composition in a weight ratio of 4:1 to 1:2.
2. A herbicidal composition as in claim 1, wherein said (a) and (4 - di - n - propylamino-3,5-dinitro-1-trifluoromethylbenzene) (b) are present, respectively, in said composition in a weight ratio of 4:1 to 1:1.
3. A process for inhibiting the growth of an herb in a monocotyledonous plant crop which comprises applying to said crop no later than at the sprouting stage of said herb, a herbicidal composition comprising as the herbicidal constituents thereof, and in combination with an inert carrier, herbicidal effective quantities of
   (a) 2' - methyl-4'-chlorophenoxyaceto - 3 - trifluoromethylanilide and
   (b) 4 - di - n - propylamino - 3,5-dinitro-1-trifluoromethyl benzene, said (a) and (b) being present respectively, in said composition in a weight ratio of 4:1 to 1:2.
4. A process as in claim 3 in which said (a) and (b) are present, respectively, in said composition in a weight ratio of 4:1 to 1:1.
5. A process as in claim 3 in which said crop is rice.
6. A process as in claim 3 in which said crop is onion.
7. A process as in claim 3 in which said crop is barley.
8. A process as in claim 3 in which said herb is broad leaved.
9. A process as in claim 3 in which said herb is narrow leaved.

(References on following page)

References Cited

UNITED STATES PATENTS 3,257,190  6/1966  Soper _____ 71—118 X

FOREIGN PATENTS 972,978  10/1964  Great Britain.
1,009,200  11/1965  Great Britain.

OTHER REFERENCES

Thompson et al.: Botanical Gazette, vol. 107, pp. 476–507 (pp. 479–482, 486, 490, 494, 495, 497–500, 503, 505–506 particularly relied upon).

JAMES O. THOMAS, JR., *Primary Examiner.*